United States Patent
Göricke et al.

(10) Patent No.: US 7,209,811 B1
(45) Date of Patent: Apr. 24, 2007

(54) SYSTEM AND METHOD FOR CONTROLLING A SAFETY-CRITICAL RAILROAD OPERATING PROCESS

(75) Inventors: Volker Göricke, Wolfenbüttel (DE); Bernd Prade, Baddeckenstadt (DE); Ralf Schiwasinkske, deceased, late of Braunschweig (DE); by Waltraud Erika Vinke geb Schiwasinske, legal representative, Celle (DE); by Beatrix Margarete Helene Wahlen, legal representative, Tostedt (DE); by Gudrun Anna Busch geb Löhrke, legal representative, Bremervörde-Bevern (DE); by Gabriele Prävk, legal representative, Hamburg (DE); by Marco Ralf Schiwasinske, legal representative, Celle (DE); by Julia Rosemarie Schiwasinske, legal representative, Celle (DE); by Maren Ingrid Schiwasinske, legal representative, Celle (DE); by Hannelore Elfriede Anna Löhrke, legal representative, Bremervörde-Bevern (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 11/173,159

(22) Filed: Jul. 5, 2005

Related U.S. Application Data

(63) Continuation of application No. 10/496,082, filed as application No. PCT/DE01/04485 on Nov. 22, 2001, now abandoned.

(51) Int. Cl.
*G06F 17/00* (2006.01)

(52) U.S. Cl. .............................. 701/19; 701/29; 701/33

(58) Field of Classification Search .................. 701/19, 701/29, 33
See application file for complete search history.

(56) References Cited

U.S. PATENT DOCUMENTS

| | | | | | |
|---|---|---|---|---|---|
| 4,198,678 | A | * | 4/1980 | Maatje et al. | .................. 701/70 |
| 5,794,167 | A | * | 8/1998 | Gruere et al. | .................. 701/29 |

FOREIGN PATENT DOCUMENTS

DE   10053023 C1   9/2002

(Continued)

*Primary Examiner*—Thomas Black
*Assistant Examiner*—Marie A Weiskopf
(74) *Attorney, Agent, or Firm*—Morrison & Foerster LLP

(57) ABSTRACT

The invention relates to a method for controlling a safety-critical railway operating process in which the program necessary for the above is divided into a system software (V,PMS) and a software (BO) specific for railway management. External commands (K) and messages (M), which affect the control, are recorded and transmitted to commercial computers (R1,R2) in which the actual process control runs, by means of the system software running in one or several secure signalling computers (SR*), as defined by the relevant railway operating condition. The processing of the program specific for railway management can occur in two channels, parallel or serially, whereby the monitoring of whether the commercial computers have reached the same result is carried out in the secure signalling computers. The output (SB) to the process (BA) for control also occurs from there, so long as the secure comparison recognizes that the commercial computers have provided the corresponding process result at least twice, otherwise the signalling connection to the process elements (W,S) is securely cut. The advantage of the invention is that the same software can always be used for the secure signalling computers and the railway management software can be separately developed and checked without being linked to the system software. Significant cost and time savings can thus be made relative to the state of the art without affecting safety.

18 Claims, 2 Drawing Sheets

FOREIGN PATENT DOCUMENTS

| | | |
|---|---|---|
| EP | 0132548 A1 | 2/1985 |
| EP | 0503336 A2 | 9/1992 |
| EP | 1197418 B1 | 4/2002 |
| WO | 9203787 A1 | 3/1992 |

* cited by examiner

SYSTEM AND METHOD FOR CONTROLLING A SAFETY-CRITICAL RAILROAD OPERATING PROCESS

CLAIM FOR PRIORITY

This application claims priority to International Application No. PCT/DE01/04485, which was published in the German language on Jun. 12, 2003, and filed in the German language on Nov. 22, 2001.

TECHNICAL FIELD OF THE INVENTION

The invention relates to a system and method for controlling a safety-critical railroad operating process.

BACKGROUND OF THE INVENTION

Railroad operating processes are processes which are safety-critical because any malfunctions which are not detected in the appropriate time, and whose effect on the process is not prevented, can lead to considerable damage to property and possibly also place people in danger. For this reason, devices which are reliable in terms of signaling technology have been used for controlling such processes. The objective of these devices is to detect malfunctions both within the process to be controlled and within the process control system itself, and to subsequently place the process in a safe state, or leave it in such a state. Such control systems which are reliable in terms of signaling technology can be embodied in different technologies, for example using relay technology or electronic technology. In process control which is reliable in terms of signal technology using computers, expensive special computers have been used which process the waiting/queued processing orders on two channels and continuously compare, by means of signaling technology, processing sequences for correspondence in terms of contents. Control instructions which are produced are output to the process elements of the process to be controlled only if both processing channels have each arrived at the same result; otherwise, the connection to the process is interrupted, unless there is at least one backup computer which can take over, and actually takes over, the functions of the failed computer.

The abovementioned functions of the reliable inputting and outputting of data and the comparison of data with, if appropriate, reliable shutting down of process elements are brought about by the system software of the reliable computers. In addition, the reliable computers have also contained the railroad administration-specific software for the actual process control, for example the signaling cabin operations. The railroad administration-specific software is determined by the operating rules of the respective railroad administration and it describes, for example, the dependencies, predefined by it, of the setting and release of the routes (Signal+Draht [Signal and Wire], 77 (1985) 12, pp. 259–265). The railroad administration-specific software does not only differ from railroad administration to railroad administration, but also at least partially from one piece of equipment to another in the same railroad administration. This means that the software which is to be loaded into a computer, which is reliable in terms of signaling technology, and runs on the computer, differs from one application case to another, it being necessary to prove or make credible the freedom from faults of the loaded software by means of a safety certificate for each application case. As a result of the proliferation of the system software and of the railroad administration-specific software in each computer, this leads to complex software packets which are difficult to manage and which are time-consuming and costly to produce and to test.

FIG. 2 shows a known computer SR which is reliable in terms of signaling technology, for executing a process by means of preferably identical processing programs in two independent processing channels K1, K2. The reliable computer SR stands for any desired number of computers which are reliable in terms of signaling technology. Their number is determined essentially by the magnitude of the process to be controlled. The process to be controlled is a railroad operating process with which a railroad system BA is to be acted on. As representatives for the process elements of the railroad system, a railroad switch W and a signal S are indicated in the drawing. The control and the monitoring of the process elements is carried out by means of control and monitoring circuits which have been developed for that purpose, which are not explicitly illustrated in the drawing and via which control instructions SB are output by the reliable computer SR to the process elements and messages M are input into the reliable computer from the process elements.

The computer SR which is reliable in terms of signaling technology outputs the messages M transmitted to it by the process to an input and display computer EAR via a communications bus KB. The input and display computer EAR serves, inter alia, for monitoring the railroad operating process according to representation rules defined in the respective railroad operating rules. It is preferably embodied as a computer which is process-protected in terms of signaling technology. Using the input and display computer EAR, the commands K for controlling the railroad operating process are also generated and transmitted to the computer SR which is reliable in terms of signaling technology. The inputting can be carried out here by an operator, for example a stationmaster, or else by means of an automatic system, for example for automatic points changing or the transit mode.

The messages and commands are processed in the computer which is reliable in terms of signaling technology, on two channels in accordance with the conditions and dependencies which are defined in the respective operating rules of a railroad operator. The data, addresses and control signals which are respectively present on the buses of the two processing systems are continuously compared with one another in a way which is reliable in terms of signaling technology in order to be able to detect immediately any discrepancies. Test programs ensure that the input/output register of the reliable computer and its program memories and main memories as well as its address registers are checked within predefined minimum time periods to determine whether their memories can assume either the one state or the other. Any malfunctions are thus detected in an event-controlled or time-controlled fashion and lead to the external equipment being reliably shut down: control instructions to railroad switches can then no longer be output and the signals go to the Stop setting.

By virtue of the fact that the conditions and dependencies which are predefined by the respective operating rules of a railroad administration and are represented in the drawing by elliptical place markers BO, are stored in the program memories of the reliable computer SR and mixed up with the system software, the software which is stored in the reliable computers in order to control the railroad operating process is individual software which is very complex and extraordinarily costly both to produce and test.

SUMMARY OF THE INVENTION

The present invention discloses a method for controlling a safety-critical railroad operating process, whose programs, which are necessary for the reliable process control, are less costly to produce and which makes it possible to react quickly and cost-effectively to any changed requirements of a railroad operator with respect to the process control system. The object of the invention is also to disclose a device for carrying out this method.

One embodiment of the invention comprises exporting the railroad administration-specific software from the computer or computers which are reliable in terms of signaling technology to commercial computers which process the data there at least twice in each case and test it reliably for correspondence before outputting it to the process in the computers which are reliable in terms of signaling technology. The computers which are reliable in terms of signaling technology have not only the function of performing data comparison but essentially also the function of reliably acquiring the incoming messages and commands, and transmitting them to the commercial computers as well as reliably acting on the process elements and in the event of a fault interrupting the connection to the process elements in a way which is reliable in terms of signaling technology.

BRIEF DESCRIPTION OF THE DRAWINGS

The invention is explained in more detail below with reference to the exemplary embodiments illustrated in the drawings, in which.

DETAILED DESCRIPTION OF THE INVENTION

Figure 1:
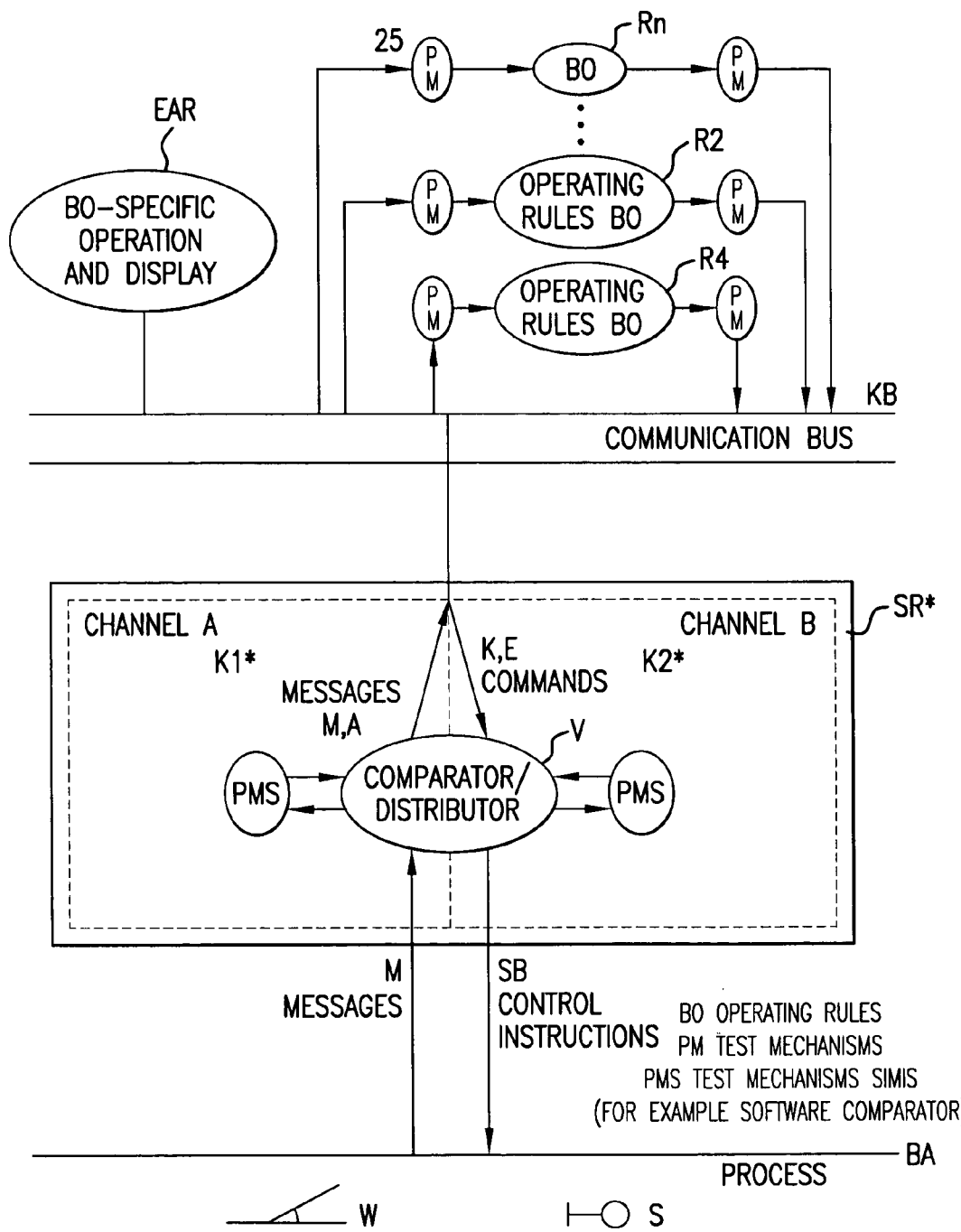
FIG. 1 is a schematic view of the structure of the device according to the invention for controlling a safety-critical railroad operating process.
Figure 2:
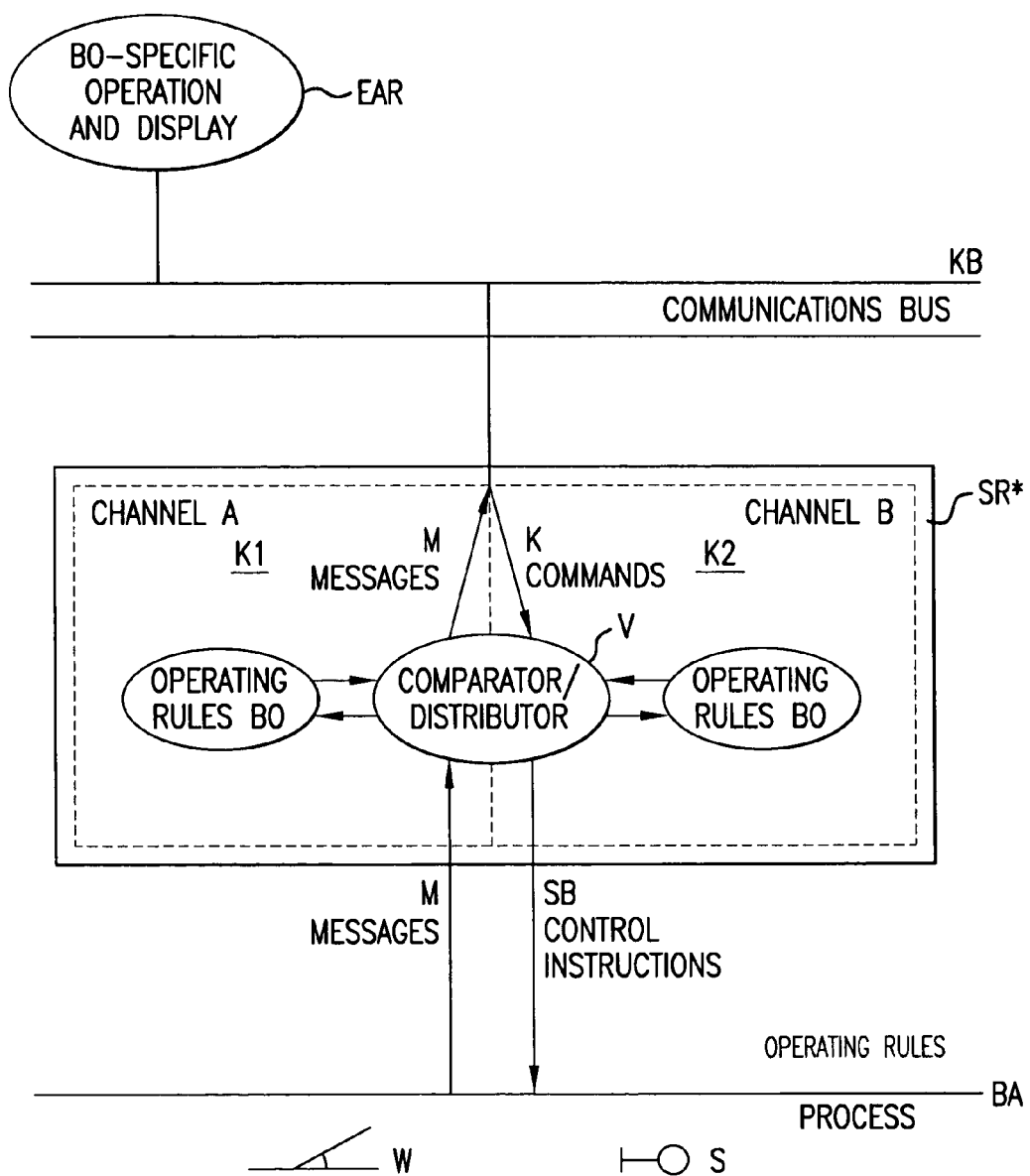
FIG. 2 shows the structure of a corresponding device which is embodied according to the prior art.

In the device according to the invention (illustrated in FIG. 1) for controlling a railroad operating process, there is also at least one computer SR* which is reliable in terms of signaling technology and has two processing channels K1 and K2 which are preferably both structured and operated identically. The function of the computer SR* is, similarly to the conventional computer SR which is reliable in terms of signaling technology, to reliably acquire, and feed to the processing means, the messages M and commands K which are fed to it. In addition, its function is to output control instructions SB, produced reliably in terms of signaling technology, to the process elements W, S of the respective railroad equipment BA and to ensure that the outputting of such control instructions is prohibited, in a way which is reliable in terms of signaling technology, in the event of a fault. The processing of the conditions and dependencies, defined by the respective railroad operating rules BO, for controlling and monitoring the railroad operating process does not take place, in contrast to the prior art, in the computer or computers SR* which is/are reliable in terms of signaling technology but rather in commercial computers R1, R2, . . . Rn in which the equipment-specific data for controlling the railroad operating process is also stored. The computers R1, R2 are representative of one or more computer pairs, each computer also being able to belong to more than one pair. Three computer pairs can therefore be formed from three computers. They each carry out processing orders A fed to them by the reliable computer SR* independently of the respective other computer in accordance with the conditions and dependencies defined for the process control in the respective railroad operating rules BO. The two computers of each commercial computer pair R1, R2 transmit their working results to the computer SR* which is reliable in terms of signaling technology, the chronologically first computer R1 or R2 bringing about a waiting point with time monitoring, at which point the system waits for the working result of the other computer or computers, or in the event of the time being exceeded a fault procedure is carried out. Test mechanisms PM for the plausibility of the messages fed to the commercial computer pairs R1, R2, and of the signatures of the outputs and memory areas produced by them are indicated schematically in FIG. 1. The commands K which are fed to the reliable computer SR* via the input and display computer EAR are converted by said computer SR* into processing orders A and transferred to the commercial computers R1, R2 in the form of telegrams. They bring about the processing therein in accordance with the conditions and dependencies of the respective railroad operating rules BO.

In the event of program points which provide for the programs to be further processed only after a predefined waiting time being reached by the commercial computers during the processing of the railroad administration-specific software by the computers, the computer which is reliable in terms of signaling technology ensures, in response to a corresponding request by the commercial computers, synchronization of the processing programs of the commercial computers for further processing of the programs after the expiry of the waiting time. For example, after the expiry of a waiting time of several seconds a sensor message which is determined by the commercial computers will be read in and evaluated.

The processing results E which are determined by the commercial computer pair R1, R2 are fed as telegrams to the computer SR* which is reliable in terms of signaling technology, distributed there between the two processing channels K1*, K2* in a way which is reliable in terms of signaling technology and compared for correspondence in a way which is reliable in terms of signaling technology. The function block V represents in the drawing the reliable distribution of messages and the reliable comparison of the results produced by the commercial computers R1, R2, the programs which relate to the above being stored as system software in said function block V. The test mechanisms PMS of the computer which is reliable in terms of signaling technology are embodied in a way which is reliable in terms of signaling technology, in contrast to the test mechanisms PM of the commercial computers R1, R2.

The particular advantage of the device according to the invention, compared to a corresponding device according to the prior art, is that the functions of the reliable inputting and outputting and of the reliable data comparison are to be implemented in the computer which is reliable in terms of signaling technology, and this is done independently of the requirements and conditions respectively defined by the operating rules of the individual railroad administrations. In this way, not only is the system software which runs in the reliable computer or reliable computers simple and easy to manage but it is also the same for all application cases, that is to say no longer has to be produced newly from case to case and subjected to approval testing. The railroad administration-specific software which is determined by the different operating rules of the individual railroad administrations runs in the commercial computers. Its interaction with the system software of the reliable computers does not need to be tested. Instead, all that is necessary is to comply with the specified interface between the computer which is reliable in terms of signaling technology and the commercial computer and to test the functionality of the actual railroad administration-specific software which is to be implemented in the commercial computers, i.e. to test whether certain inputs actually lead to certain outputs. This functionality testing takes place separately from the testing of the system software and is, in contrast to the prior art, no longer integrated into the system software of the reliable computers, which is itself also easier to manage than in the prior art.

The production of the railroad administration-specific software does not necessarily have to take place at the manufacturer of the computers which are reliable in terms of signaling technology, who is responsible for the safety of the processing events in terms of signaling technology. Instead, it is possible to allocate orders for the production of the programs for the commercial computers to qualified engineering offices or the like which have to reconcile the software produced by them with the respective railroad administration and, for example, an approval authority such as the Eisenbahnbundesamt (German Federal Railroad Office). This makes it possible to adapt the programs for controlling and monitoring a safety-critical railroad operating process to the respective conditions very much more quickly and economically than hitherto without having to make any compromises in terms of safety as a result. In the exemplary embodiment illustrated above, the commercial computers R1, R2 stand for one or more double computer systems or computer systems provided with redundant computers in whose individual computers in each case identical programs for processing the conditions and dependencies predefined by the respective railroad operating rules are to run, in which case preferably either specific sub-functions of the operating rules are to be implemented in each case by the individual commercial computers or else specific parts of the railroad equipment are to be acted on in each case. However, the arrangement can also be configured such that the commercial computers R1, R2 are each individual computers in which the programs, determined by the operating rules of a railroad administration, of the railroad administration-specific software are processed repeatedly, and at least twice in succession, independently of one another. The railroad administration-specific software which is necessary for this can be configured in different ways or else can be identical in terms of contents for both processing procedures.

For the transmission of the results produced by the commercial computers to the computer or computers which is/are reliable in terms of signaling technology, a data transmission which is preferably not reliable in terms of signaling technology is preferably used, during which transmission either the results which are produced on two channels either serially or in parallel are transmitted to the reliable computer or computers on two channels, or else the results are transmitted twice in succession over just one channel. A second or third redundant channel increases the availability. Any data falsifications on the transmission path from the commercial computers to the computers which are reliable in terms of signaling technology, and vice versa, can be detected in the receiving computer by a signature which is entered by the dispatching computer and which encodes the telegram contents by means of a computing rule. During the serial transmission of data to the reliable computers, the data is provided with identifiers which make it possible for the computers which are reliable in terms of signaling technology to detect whether the transmitted data is current and actually originates from different computer channels of the commercial computers and/or whether it is the result is of different processing procedures. During the transmission of data over separate buses, the computers which are reliable in terms of signaling technology can detect, from the data transmitted to them via one bus or the other, whether or not this data also actually originates from the one computer or the other of a commercial computer pair.

In an advantageous embodiment of the invention, the commercial computer or computers can be embodied as what are referred to as operating console computers, by means of which the commands from a railroad employee or from an automatic system can be output for execution to the railroad operating process and the acknowledgements of the railroad operating process can be displayed. In the operating console computers, the programs for inputting and displaying commands and messages and the programs via which the process elements are controlled in accordance with the railroad operating rules then run independently of one another. The programs for the inputting of commands and the displaying of the process events can also be combined with the programs for process control, such as are respectively predefined by the railroad operating rules.

The computer or computers which are reliable in terms of signaling technology can also be embodied as an m of n computer system in which the decision as to whether control instructions, and if so which control instructions, are to be output to the process can be taken by majority decision by at least two intact computers.

The outputting of the control instructions to the process takes place on two channels. Each computer has the possibility of preventing the outputting of control instructions when processing errors are detected.

The method according to the invention and the device according to the invention can be used advantageously for all safety-critical railroad operating processes. Such an application can be, for example, the reliable control of a railroad operation by a signal cabin or else also, for example, the reliable control of a railroad crossing, of an axle counting system or of track-mounted and vehicle-mounted equipment of a continuous automatic train control system (LZB).

What is claimed is:

1. A method for controlling a safety-critical railroad operating process using at least one computer, comprising:
outputting control signals to process elements which are produced from incoming commands in accordance with a set of railroad operating rules; and
feeding messages originating from the process elements to a process state monitoring system and process control system, wherein
one system software package, whose programs enable the computer to perform inputting/outputting and the data comparison is stored in the computer, and railroad administration-specific software which includes conditions and dependencies predefined for the railroad operating process by a railroad administration by means of a set of railroad operating rules, is stored in at least one commercial computer, such that processing orders are generated from the computer from the commands and the messages fed thereto, and are transmitted to the at least one commercial computer, such that the processing orders are processed there independently from one another, at least twice,
the results which are produced in the process and/or intermediate results are transmitted to the computer and checked for correspondence of their contents, the computer accepting the results and/or intermediate results and outputting to the process of the control instructions derived therefrom, which have been made available by the commercial computers such that they correspond on at least two occasions, wherein the at least one commercial computer is an operating console computer via which commands can be input into the computer and messages can be displayed.

2. The method as claimed in claim 1, wherein identical or differing software is used for the at least two-fold execution of processing orders in the at least one commercial computer.

3. The method as claimed in claim 1, wherein time events which occur during the execution of the railroad administration-specific software are synchronized by the computer at the request of the at least one commercial computer.

4. The method as claimed in claim 1, wherein the results and/or intermediate results which are determined by the at least one commercial computer are transmitted to the computer by communication channels.

5. The method as claimed in claim 1, wherein transmission of data in telegrams is provided, and the telegrams have signatures added to them, from which a respective receiving computer can detect whether the telegrams have been transmitted in a non-falsified form.

6. The method as claimed in claim 1, wherein a transmission of data in telegrams is provided, and the telegrams have signatures added to them from which the computer can detect whether falsifications have occurred in program memories and data memories of the at least one commercial computer, or whether a CPU of one of the commercial computers is no longer operating correctly.

7. The method as claimed in claim 1, wherein the processing orders are processed essentially simultaneously in at least two commercial computers in each case or are processed in a chronologically serial fashion in one computer, and the results and/or intermediate results which are obtained are fed to the computer in each case in pairs for comparison.

8. The method as claimed in claim 7, wherein telegrams have identifiers added to them, from which the computer can detect whether the telegrams have actually been produced separately.

9. The method as claimed in claim 7, wherein the computer detects, by reference to the result messages of the at least one commercial computer which are fed to it via different inputs, whether the telegrams originate from different computers.

10. The method as claimed in claim 1, wherein systematic errors in the operating system software of the at least one commercial computer is prevented by using differing operating systems on the computers involved.

11. The method as claimed in claim 1, wherein systematic errors in the hardware of the at least one commercial computer is prevented by using differing computer components on the computers involved.

12. A device for controlling a safety-critical railroad operating process, comprising:

at least one computer which outputs to process elements control instructions produced from incoming commands in accordance with a set of railroad operating rules, and feeds messages originating from the process elements to a process state monitoring system and process control system, wherein a system software package whose programs enable the computer to perform the inputting/outputting such that the data comparison is then implemented in the computer; and at least one commercial computer is provided in which railroad administration-specific software which includes conditions and dependencies for the control of the railroad operating process which are predefined by a railroad administration by railroad operating rules is implemented, in that the computer and the at least one commercial computer are connected to a communications system via which the computer transmits processing orders to the at least one commercial computer and receives results and/or intermediate results therefrom, the at least one commercial computer being designed to execute each processing order independently of one another at least twice, in that the computer checks the results and/or intermediate results which are transmitted thereto at least in pairs in each case by the at least one commercial computer for correspondence between their contents and derives therefrom control instructions for process elements as a function of the check result and causes them to be output to the process via drivers provided, wherein the at least one commercial computer is an operating console computer via which commands can be input into the computer and messages can be displayed.

13. The device as claimed in claim 12, wherein programs having a functionality are installed in the commercial computer.

14. The device as claimed in claim 12, wherein the at least one commercial computer executes the processing orders with identical or differing software at least twice in each case.

15. The device as claimed in claim 12, wherein at least two commercial computers which execute the same processing orders in pairs independently of one another are provided.

16. The device as claimed in claim 12, wherein to process different functionalities or sub-functionalities or to control and monitor different equipment parts, in each case a plurality of commercial computers are provided in single-computer or multicomputer designs.

17. The device as claimed in claim 12, wherein the computer is designed to detect, from identifiers which are added to the results and/or intermediate results which are transmitted by the at least one commercial computer, whether the results and/or intermediate results originate from different processing processes.

18. The device as claimed in claim 12, wherein the computer outputs any control instructions to the process on two channels.

* * * * *